(12) United States Patent
Saha et al.

(10) Patent No.: US 11,392,851 B2
(45) Date of Patent: Jul. 19, 2022

(54) SOCIAL NETWORK NAVIGATION BASED ON CONTENT RELATIONSHIPS

(71) Applicant: Microsoft Technology Licensing, LLC, Redmond, WA (US)

(72) Inventors: Ankan Saha, San Francisco, CA (US); Shaunak Chatterjee, Sunnyvale, CA (US); Ajith Muralidharan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 752 days.

(21) Appl. No.: 16/008,190

(22) Filed: Jun. 14, 2018

(65) Prior Publication Data

US 2019/0385089 A1    Dec. 19, 2019

(51) Int. Cl.
*H04L 67/50* (2022.01)
*G06N 20/00* (2019.01)
*G06F 16/93* (2019.01)
*G06F 16/28* (2019.01)
*G06N 5/04* (2006.01)
*G06F 3/0485* (2022.01)

(52) U.S. Cl.
CPC ........... *G06N 20/00* (2019.01); *G06F 16/282* (2019.01); *G06F 16/93* (2019.01); *H04L 67/535* (2022.05); *G06F 3/0485* (2013.01); *G06N 5/04* (2013.01)

(58) Field of Classification Search
CPC ....... G06N 20/00; G06F 16/93; G06F 16/282; G06F 3/0485; H04L 67/22
See application file for complete search history.

(56) References Cited

U.S. PATENT DOCUMENTS

| | | | | |
|---|---|---|---|---|
| 8,332,782 B1* | 12/2012 | Chang | ................. | H04L 12/6418 715/853 |
| 8,584,034 B2* | 11/2013 | Holt | ..................... | G06F 3/0482 715/784 |
| 8,898,713 B1* | 11/2014 | Price | .................. | G06F 16/7867 725/94 |
| 9,292,791 B2* | 3/2016 | Lu | ............................ | G06N 5/04 |
| 10,609,183 B2* | 3/2020 | Thomee | .................. | G06F 40/30 |
| 2018/0315084 A1* | 11/2018 | Savage | .................. | G06Q 50/01 |

* cited by examiner

*Primary Examiner* — Jennifer N Welch
*Assistant Examiner* — Amy P Hoang
(74) *Attorney, Agent, or Firm* — Schwegman Lundberg & Woessner, P.A.

(57) ABSTRACT

Methods, systems, and computer programs are presented for providing a user experience that facilitates navigation among different topics and articles on a social network. One method includes an operation for identifying a hierarchy of topics, each topic corresponding to a respective subject, where the hierarchy defines relationships between the topics. A first topic page for a first topic is presented in a user interface in the social network. The first topic page includes articles and first options for navigating to topic pages of topics related to the first topic. The method further includes detecting a selection of a first article. In response to detecting the selection, a first article page for the first article is presented in the user interface. The first article page includes details of the first article and second options for navigating to topic pages of topics related to the first article.

17 Claims, 9 Drawing Sheets

FIG. 1

102 — (main interface)

104 — Jane Doe, AI Engineer at Corp A

106 — Share an article, photo, video or idea
- Write an article | Images | Video | Post
- Jack Smith · 1st
- Senior User Experience Design at Corp B
- Interesting article about job trends across geographies and companies. Most interesting is the interactive charts, providing interesting views of job migrations and opportunities

108 — What people are talking about
- Russia expels 60
  3hrs ago – 10K readers
- Ivies accept few
  2hr ago – 5,200 readers
- Coffee cancer warning
  5hr ago – 25K readers
- Tesla recalls Model S
  6hr ago – 28K readers
- Show more

110 — (chart)

112 — Your Communities
- #ai
- #Algorithms
- #EditorPicks
- #AIConference2018
- #BestAdvice
- #MachineLearning
- #GolfTips
- #TravelEurope

108

What people are talking about
- Russia expels 60
  3hrs ago – 10K readers
- Ivies accept few
  2hr ago – 5,200 readers
- Coffee cancer warning
  5hr ago – 25K readers
- Tesla recalls Model S
  6hr ago – 28K readers Show more

202

206

Al Smith
CEO at Corp C
Published · 2d

+Follow

ARTIFICIAL INTELLIGENCE | MACHINE LEARNING | DEEP LEARNING

50's 60's 70's 80's 90's 2K's 10's

More Predictions for AI Technology Disruptions

Al Smith

Like   Comment   Share

204

Machine Learning
Topic
[ Following ]

208

( Related Topics )

Super-Topics
Algorithms
Technology

Sub-topics
Neural Networks
Regression
Image recognition

FIG. 2

SOCIAL NETWORK NAVIGATION BASED ON CONTENT RELATIONSHIPS

TECHNICAL FIELD

The subject matter disclosed herein generally relates to methods, systems, and programs for providing a user interface to navigate content on a social network.

BACKGROUND

Social networks often recommend content that is placed in the user feed of users. The content may include articles, news, tutorials, etc. A goal of the social network is to find content of interest to users so the users stay longer on the social network website and to increase the value of the social network for the users.

Sometimes, users perform searches to find content of interest. However, given the ever-increasing amount of available content on the social network and on the Internet, users may have difficulty finding what they are exactly looking for.

BRIEF DESCRIPTION OF THE DRAWINGS

Various ones of the appended drawings merely illustrate example embodiments of the present disclosure and cannot be considered as limiting its scope.

FIG. 1 is a user interface showing a feed page on a social network, according to some example embodiments.

FIG. 2 is a user interface for a topic page in the social network, according to some example embodiments.

DETAILED DESCRIPTION

Figure 3:
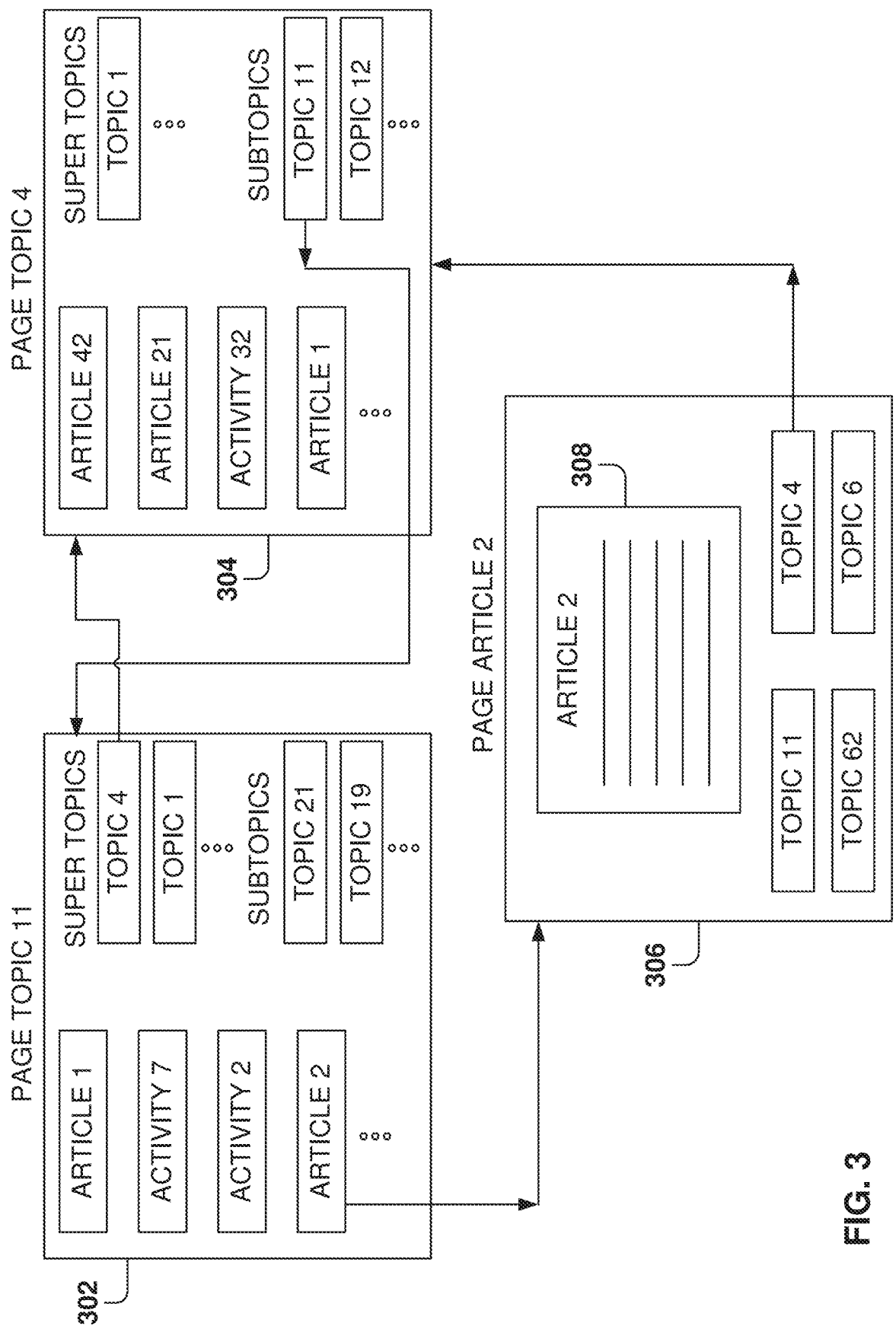
FIG. 3 illustrates the navigation between topic pages and article pages, according to some example embodiments.

Example methods, systems, and computer programs are directed to providing a user experience that facilitates navigation among different topics and articles on a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some implementations, methods and user interfaces are provided for providing a new user experience to navigate the available content on the social network. Articles and other types of content are categorized according to their topic and a hierarchy of topics is defined for traversing through articles and topic pages. A user interface provides options for quickly navigate to a topic page, to pages above and below a given topic within the hierarchy, to pages of related topics, to articles associated with the topic, etc. This customer experience allows finding content of interest quickly as well as easily exploring related subjects.

In one embodiment, a method is provided. The method includes an operation for identifying a hierarchy of topics in a social network, each topic corresponding to a respective subject. The hierarchy of topics defines relationships between the topics. Additionally, the method includes an operation for causing presentation, in a user interface of a user device, of a first topic page for a first topic in the social network. The first topic page includes one or more articles and one or more first options for navigating to topic pages of topics related to the first topic. Further, the method includes operations for detecting a selection in the user interface of a first article from the one or more articles, and, in response to detecting the selection of the first article, causing presentation in the user interface of the user device of a first article page for the first article. The first article page comprises details of the first article and one or more second options for navigating to topic pages of topics related to the first article.

In another embodiment, a system includes a memory comprising instructions and one or more computer processors. The instructions, when executed by the one or more computer processors, cause the one or more computer processors to perform operations comprising: identifying a hierarchy of topics in a social network, each topic corresponding to a respective subject, wherein the hierarchy of topics defines relationships between the topics; causing presentation, in a user interface of a user device, of a first topic page for a first topic in the social network, the first topic page including one or more articles and one or more first options for navigating to topic pages of topics related to the first topic; detecting, in the user interface, a selection of a first article from the one or more articles; and, in response to detecting the selection of the first article, causing presentation, in the user interface of the user device, of a first article page for the first article, the first article page comprising details of the first article and one or more second options for navigating to topic pages of topics related to the first article.

In yet another embodiment, a non-transitory machine-readable storage medium includes instructions that, when executed by a machine, cause the machine to perform operations comprising: identifying a hierarchy of topics in a social network, each topic corresponding to a respective subject, wherein the hierarchy of topics defines relationships between the topics; causing presentation, in a user interface of a user device, of a first topic page for a first topic in the social network, the first topic page including one or more articles and one or more first options for navigating to topic pages of topics related to the first topic; detecting, in the user interface, a selection of a first article from the one or more articles; and, in response to detecting the selection of the first article, causing presentation, in the user interface of the user device, of a first article page for the first article, the first article page comprising details of the first article and one or more second options for navigating to topic pages of topics related to the first article.

FIG. 1 is a user interface showing a feed page 102 on a social network, according to some example embodiments. The feed page 102 includes different areas, such as profile information 104, user feed 106, news area 108, communities area 112, and one or more articles 110. Other embodiments may include additional areas, fewer areas, user posts, messages from other users, etc. As the user scrolls down the user teed 106, additional articles 110, advertisements, job recommendations, user posts, etc., may be presented to the user on the middle section below the articles 110. The articles 110 may be articles hosted on the social network (e.g. to read the article, the user visits a web address within the social network) or may be articles outside the social network. Further, as used herein, a "community" is equivalent to a topic.

The profile information 104 provides information about the current user logged into the social network. The user feed 106 provides input options to the user in order to share an article, images, video, message, etc. The news area 108 provides information regarding trending topics or other current news.

Further, the communities area 112 identifies the subscriptions of the user to a plurality of topics. A user may subscribe to a topic because the user performs a search on the social network, a friend recommends the topic, the social network recommends a topic, etc. A topic is defined by a subject that may be checked to determine if an item (e.g. article 110, video, news, post) belongs to the topic. When an article 110 or a news item corresponds to the subject of the topic, the article 110 or news item is associated with the topic and may be presented when a user views topic-related information.

If the user selects one of the topics in the communities area 112, the social network provides a user interface for the topic page, as illustrated below with reference to FIG. 2. When the user visits the topic page, the user may find other articles or activities of the corresponding topic.

FIG. 2 is a user interface for a topic page 202 in the social network, according to some example embodiments. In this exemplary embodiment, the topic page is for the topic "Machine Learning."

A user may get to a topic page 202 in different ways, such as by following the link provided on the feed page, performing a search for a topic, finding the topic in a page describing an article, in a share from another user, etc. In some example embodiments, a hashtag may be included in the search to indicate that it is a search for a topic page (e.g., "#MachineLearning").

In some example embodiments, the topic page 202 includes a topic area 204, a topic feed 206, a news area 108, and a related-topics area 208. The topic area 204 includes the topic name (e.g., Machine Learning) and an indication that the user is following this topic. The user follows a topic when the user selects the option to subscribe to the topic. The subscribed user may receive notifications regarding topic-related content. Additionally, the topic being followed may be listed under the profile of the user or on the communities area 112 of the feed page 102 (see FIG. 1).

The topic feed 206 includes one or more items (e.g., articles, activities, posts, news) associated with the topic. Each article includes one or more of a link to the article, an image, a title, an author, a summary, options to "like," "comment," or "share," etc. As the user scrolls down the topic feed 206, additional items may be presented.

The related-topics area 208 includes links to topic pages related to the current topic page 202. In some example embodiments, a hierarchy of topics is defined, the hierarchy including relationships between the different topics. In some example embodiments, the hierarchy is a top to bottom data structure with topics going from broader at the top two narrower at the bottom. A given topic may have a child that is related to the given topic but more specific to some area within the given topic. For example, the "Machine-Learning" topic may have a child of "Neural Networks," which is a type of machine learning.

As used herein, a subtopic of a given topic is any topic defined underneath the given topic that is connected by one or more child relationships (e.g., any of the descendants of the given topic within the tree of child-parent relationships). On the other hand, a super topic of a given topic corresponds to any of the topics above the given topic connected by a parent relationship (e.g., all the ascendants of the given topic within the tree), which means that the super topic is a more generic topic. The subtopic is less generic, i.e., more specific, than the given topic.

The related-topics area 208 may include zero or more super topics (e.g., Algorithms, Technology) and one or more sub-topics e.g., Networks, Regression, Image Recognition).

In some example embodiments, correlated topics may be identified for a given topic that are not an ascendant or descendent of the given topic. The correlated topics have a relationship to the topic but are not interconnected in the hierarchy using child-parent relationships. As used herein, a related topic may refer to a super topic, a subtopic, or a correlated topic. In other example embodiments, a related topic may refer to super topics and sub-topics. More details about the hierarchy are provided below with reference to FIG. 4.

In some example embodiments, the articles provided by the social network are tagged with one or more topics (also referred to as "tags" or "communities") and, once tagged, the articles are candidates for being presented within the topic page 202 of the corresponding topics. In some example embodiments, the topic feed 206 is billed by ranking the different candidate articles based on a variety of factors, such as topic relevance, age, author, information about the user, such as past history, etc.

FIG. 3 illustrates the navigation between topic pages and article pages, according to some example embodiments. As illustrated above with reference to FIG. 2, a topic page may include articles and activities. As used herein, an "activity" refers to an action of the user in the social network, such as a post or a share.

By providing links to topics that are relevant to a given topic or a given article, the user's experience is improved because the user may quickly navigate between areas of interest.

In the example illustrated in FIG. 3, a topic page 302 for topic 11 may include links to other topics, such as pages of super topics and pages of sub-topics. In other example embodiments, correlated topics that are not directly related in the hierarchy may also be included as possible destinations.

If the user selects one of the related topics, the user interface changes to the topic page of the selected topic. For example, when the user is viewing the page 302 of topic 11, if the user selects topic 4, the user interface changes to present the page 304 of topic 4. On the other hand, when the user is viewing the page 304 of topic 4, if the user selects topic 11, the user interface changes to present the page 302 of topic 11.

When a user selects an article within a topic page, the user interface presents the selected article. If the article is one of the articles posted by the social network, the user interface will continue to be provided by the social network. On the other hand, if the article is an article external to the social network, the user interface will change to an external page.

In some example embodiments, the page of the article (e.g., page 306 for article 2) includes the article 308 (e.g., image or diagram, title, abstract, author, article content, etc.) and one or more links to topic pages. For example, the page 306 includes links to the pages of topics 11, 4, 62, and 6. If the user selects topic 4, the user interface will change to present the page 304 of topic 4.

Therefore, the user is able to quickly traverse different topic pages related to content that the user is viewing. The user interface provides direct links to topic pages that are related to another topic or to a given article. The customer experience of the user in the social network is improved by the added flexibility of searching for information, without having to rely on entering search parameters.

If the user finds an article that is interesting, by visiting one of the topic pages related to the article, the user is able to quickly see other related articles. Additionally, by presenting suggestions for related topics to the user, the user may find other topics of interest and start following those topics to obtain ongoing information to the user feed or through the corresponding topic page.

In addition, by traversing super topics, the user is able to expand an area of interest, and the user may find additional articles of interest. In some sense, topic pages provide a vehicle for a user to investigate related articles when viewing an article, by visiting a topic page and quickly being presented with related articles.

When a new article is posted or identified by the social network, a tagger identifies the one or more topics associated with the article and the article becomes a candidate to appear in the pages of the one or more topics. The article may show up at the top of the topic page, or further below, or may not even show up for a particular user if other articles are ranked higher within the topic page.

The user can navigate from the article page to the topic page and from the topic page to an article or to another topic page, and the user may select to go to a more general topic (super topic) or a more specific topic (subtopic). The user is able to navigate quickly through the content in the social network; also, the user is exposed to the hierarchy of topics that allow the user to easily navigate through the content. If the user wants to explore, the user may traverse the hierarchy, going up and down the hierarchy, to find new content.

It is noted that the embodiments illustrated in FIG. 3 are examples and do not describe every possible embodiment. Other embodiments may utilize different layouts, list related topics on the left side or the right side, or at the top of the page. The embodiments illustrated in FIG. 3 should therefore not be interpreted to be exclusive or limiting, but rather illustrative.

Figure 4:
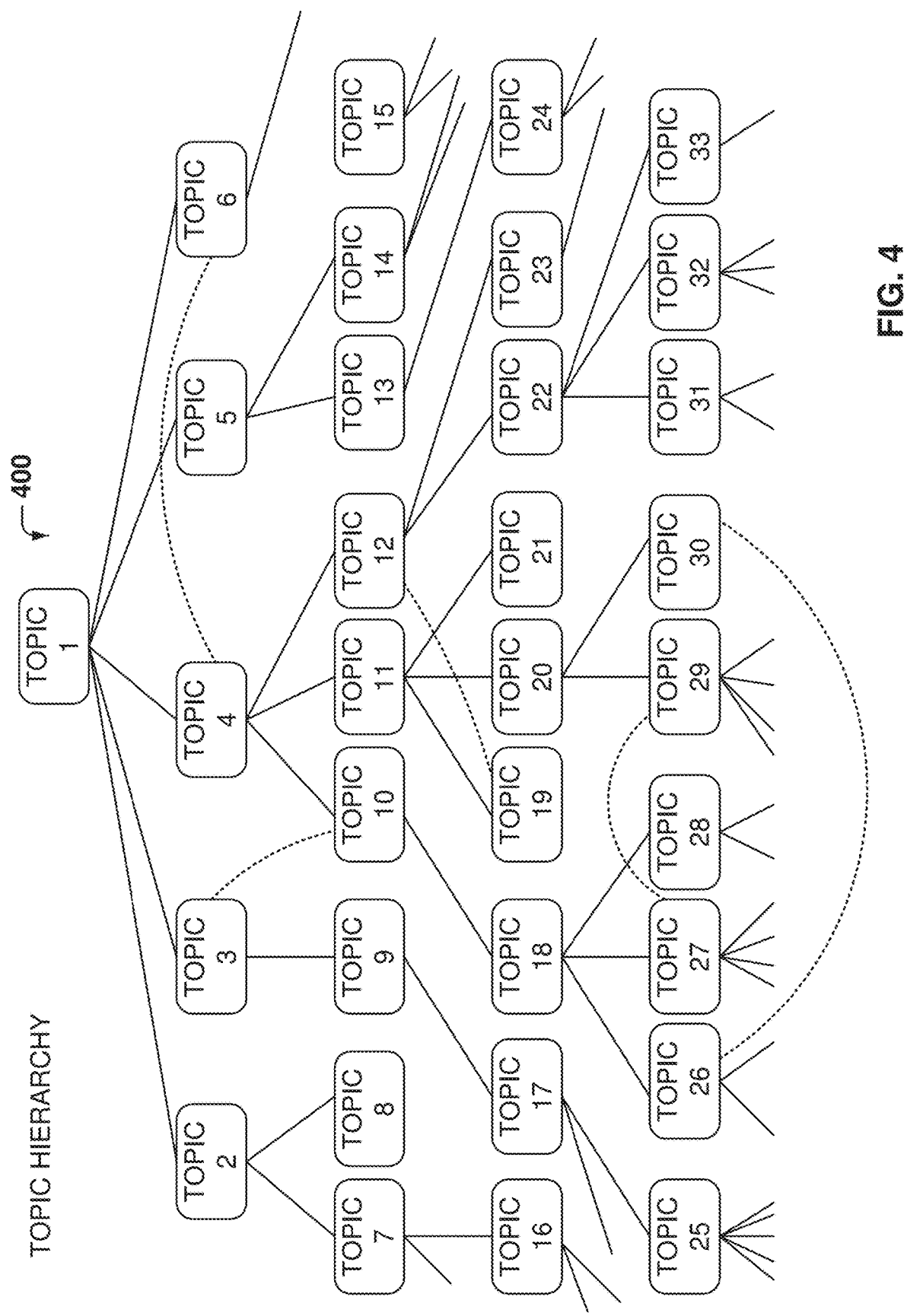
FIG. 4 illustrates an embodiment of the topic hierarchy, according to some example embodiments.

FIG. 4 illustrates an embodiment of the topic hierarchy, according to some example embodiments. In some example embodiments, the hierarchy 400 may be represented by a tree graph, such as the one illustrated in FIG. 4. The tree structure represents the parent-child relationships between topics, where the parent of a topic has a more general subject than the child.

In some example embodiments, one parent may have multiple children and a topic may have one parent. In other example embodiments, a topic may have multiple parents, which means that the topic is less general than any of the parents and the topic is related to the multiple parents.

Furthermore, in some example embodiments, the hierarchy includes only the parent-child relationships, while in other example embodiments, topics may be correlated to other topics that are not parents or descendants. For example, in hierarchy 400, topic 27 is related to topic 29, but topic 27 is not a descendent of topic 29 and vice versa.

As discussed earlier, a given topic may have one or more super topics corresponding to the ascendants of the given topic within the hierarchy, and may have zero or more subtopics corresponding to the descendants in the hierarchy. For example, topic 11 has super topics 1 and 4 and subtopics 19-21, 29-30, and the descendants of topic 29.

In some example embodiments, the social network defines the hierarchy, including the parent-child relationships as well as the "related" relationships. If a new topic is identified, the social network adds the topic somewhere within the hierarchy or creates a brand-new node under the root of the tree comprising the hierarchy.

Figure 5:
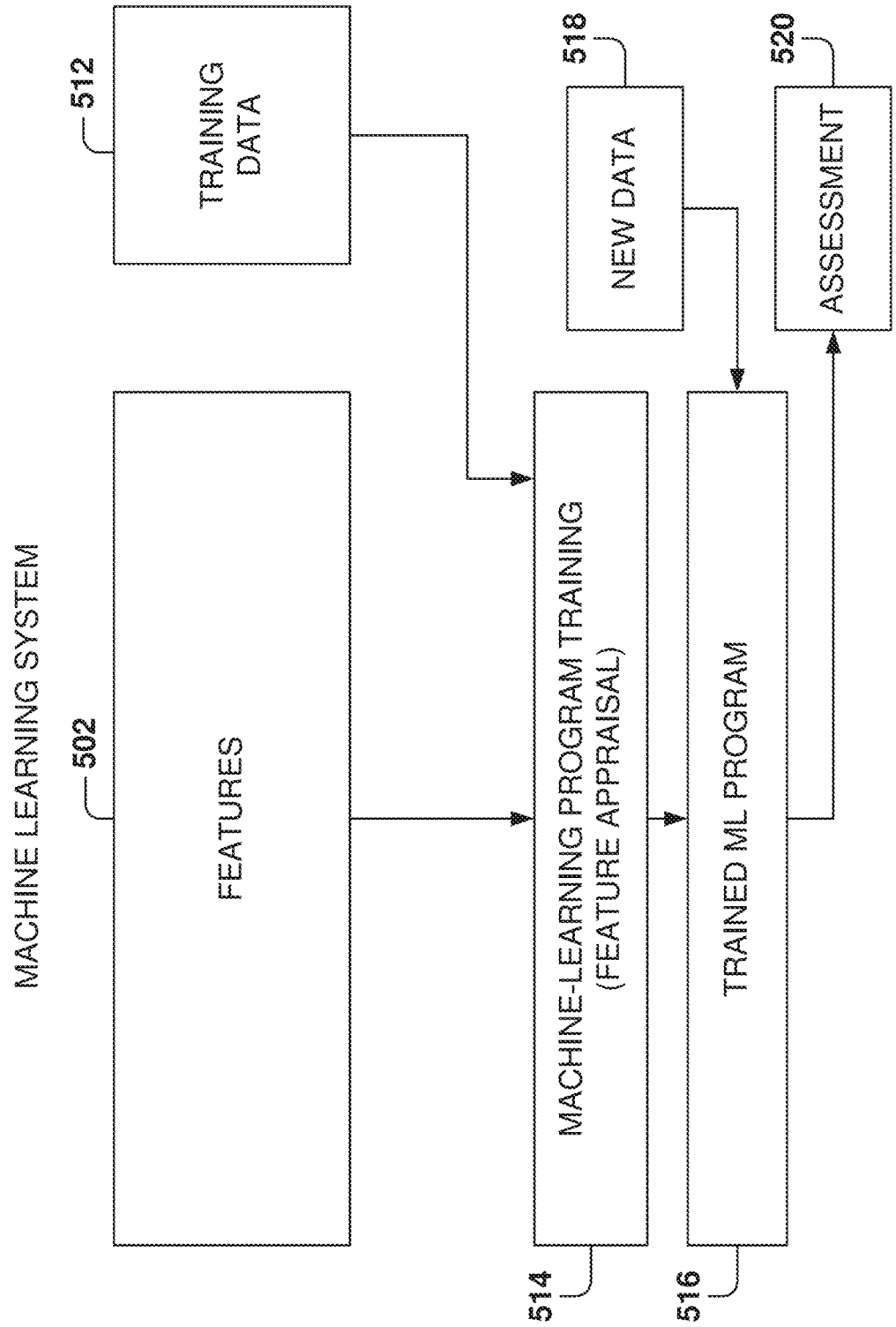
FIG. 5 illustrates the training and use of a machine-learning program, according to some example embodiments.

FIG. 5 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 512 in order to make data-driven predictions or decisions expressed as outputs or assessments 520. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 512 to find correlations among identified features 502 that affect the outcome.

The machine-learning algorithms utilize features for analyzing the data to generate assessments 520. A feature 502 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

The machine-learning algorithms utilize the training data 512 to find correlations among the identified features 502 that affect the outcome or assessment 520. In some example embodiments, the training data 512 includes labeled data, which is known data for one or more identified features 502 and one or more outcomes, such as identifying topic relationships, identifying one or more topics for an article, ranking articles within a topic page, etc.

With the training data 512 and the identified features 502, the machine-learning tool is trained at operation 514. The machine-learning tool appraises the value of the features 502 as they correlate to the training data 512. The result of the training is the trained machine-learning program 516.

When the machine-learning program 516 is used to perform an assessment, new data 518 is provided as an input to the trained machine-learning program 516, and the machine-learning program 516 generates the assessment 520 as output. For example, when a user selects a topic page, a machine-learning program, trained with social network data, utilizes the user data, topic data, and article data, to search and rank articles for the topic page.

In some example embodiments, a machine-learning program is utilized to rank articles for inclusion in the topic feed of a topic page. The machine-learning program may consider one or more of the following features: user profile data, user activity data (e.g., articles viewed by the current user and other users of the social network), author data (number of followers, number of views of previous articles, title), article data (article text, number of views, number of shares, number of comments, age of the article, topics of the article, article is a social network article or an external article). The machine-learning program is trained with labeled data regarding the identified features, and then used for determining the ranking of articles in the topics page. The plurality of available articles is ranked (e.g., assigned a score) and the topic feed is sorted based on the ranking.

In some example embodiments, machine-learning program is utilized to determine relationships among topics. The machine-learning program may consider one or more of the following features: user profile data, user activity data (e.g., articles viewed by the current user and other users of the social network), author data (number of followers, number of views of previous articles, title), article data (article text, number of views, number of shares, number of comments, age of the article, topics of the article, article is a social network article or an external article). The machine-learning program may work with an existing hierarchy to suggest relationships for the topics, such as which topics are more generic or less generic, which are the super topics and which are subtopics, etc.

In some example embodiments, a machine-learning program is utilized to recommend super topics and subtopics to a user. Using the same learning data as described above, the machine-learning program may provide recommendations based on data from the user profile in order to find articles of interest to the user. In addition, the click-through rates for topic suggestions presented to users may be considered in order to better select the topics that might be recommended to a user.

In some example embodiments, a machine-learning program is utilized to determine the topics of an article. The machine-learning program analyzes article features, including author-related data, to tag the article with one or more topics relevant to the article.

Figure 6:
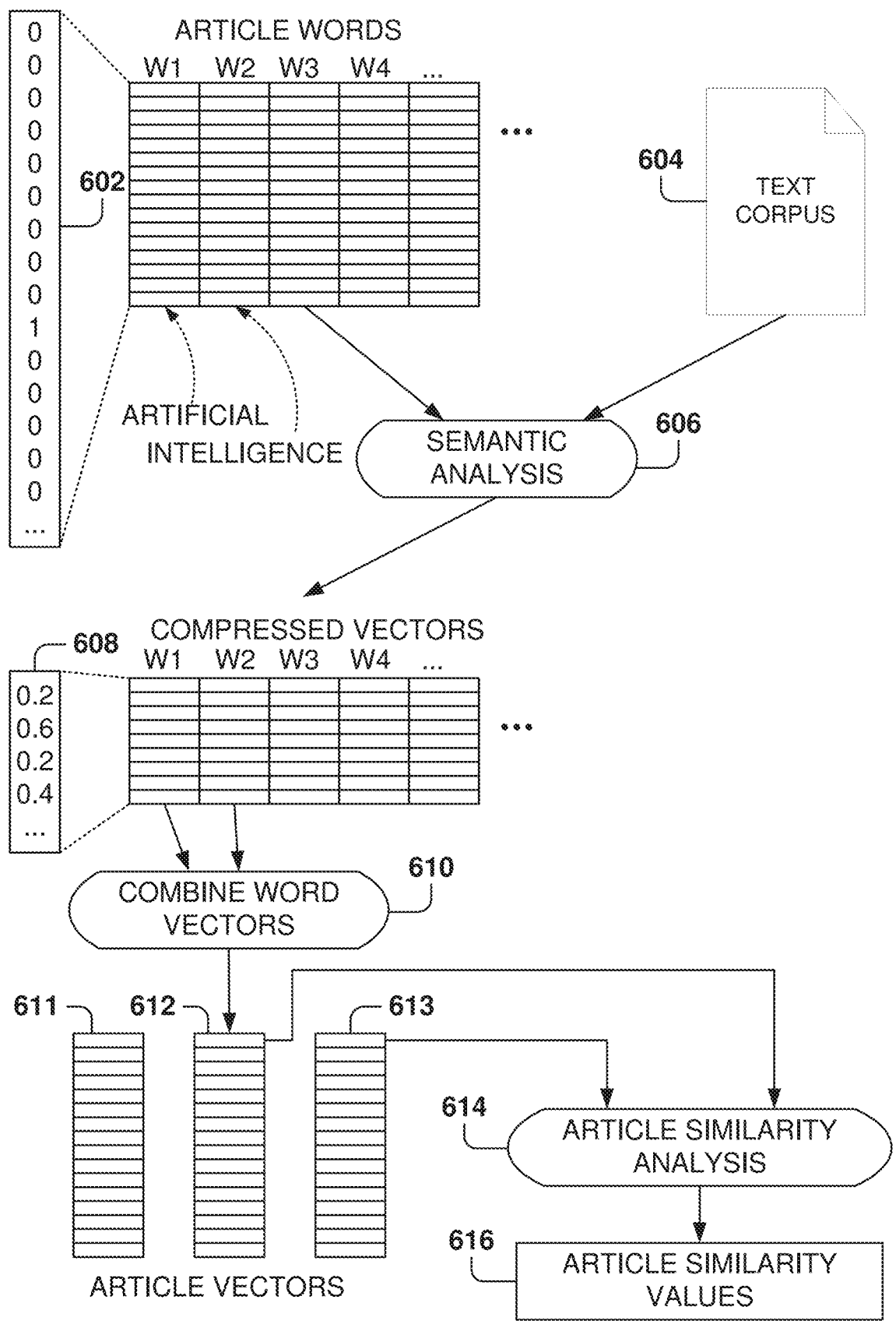
FIG. 6 illustrates a method for identifying similarities among articles based on semantic analysis, according to some example embodiments.

FIG. 6 illustrates a method for identifying similarities among titles based on semantic analysis, according to some example embodiments. In one example embodiment, each word from the article is represented as a vector the size of the vocabulary, with a 1 corresponding to the word and the rest of the elements in the vector equal to 0. This representation is referred to as a bag-of-words vector representation. For example, the word "software" has a vector 602 with a single 1 and the word "engineer" also has a single 1 in the vector, but in a different position.

In one example embodiment, the vectors are condensed into a fixed dimension vector (e.g., with a dimension of 200, but other sizes are also possible) and the elements of the condensed vector are real numbers, where more than one element may be nonzero. For example, for the word "software," there is a corresponding compressed vector 608 with a plurality of non-zero values.

The semantic analysis finds similarities among words by creating a vector 608 for each word such that words with similar meanings have vectors near each other. In one example embodiment, the tool Word2vec is used to perform the semantic analysis, but other tools may also be used, such as Gensim, Latent Dirichlet Allocation (LDA), or Tensor flow.

These models are shallow, two-layer neural networks that are trained to reconstruct linguistic contexts of words. Word2vec takes as input a large corpus of text and produces a high-dimensional space (typically between a hundred and several hundred dimensions). Each unique word in the corpus is assigned a corresponding vector 608 in the space. The vectors 608 are positioned in the vector space such that words that share common contexts in the corpus are located in close proximity to one another in the space. In one example embodiment, each element of the vector 608 is a real number.

For example, Word2vec may be utilized to identify the similarity between two words. In one example, a large number of titles were used as input, and a list was created of words having a similar meaning to the word "software." A text corpus 604 is used by the semantic analysis tool to identify similarities. In some example embodiments, the text corpus 604 includes member-related data and company data, but other embodiments may utilize fewer data or additional data, such as user posts on the social network, industry data, skill data, and the like.

In another example embodiments, a semantic analysis 606 is performed to obtain the compressed vectors 608. In some example embodiments, the following parameters were used for performing the semantic analysis 606:
  Minimum number of occurrences of a word to be considered in the vocabulary min_count (e.g., 5).
  Maximum size of left window and right window from the target word window_size (e.g., 5).
  Number of negative samples to be used negative_sample (e.g., 25)
  Number of concurrent_steps concurrent_steps (e.g., 12).
  Subsample threshold for word occurrence subsample, where words that appear with higher frequency will be randomly down-sampled (e.g., $1e^{-3}$).
  Number of epochs num_epochs (e.g., 15)

The compressed vectors 608 of an article may be combined to obtain an article vector 612, which is a compressed vector resulting from combining the compressed vectors 608 of the article words. There are several merging techniques for combining vectors. In one example embodiment, the vectors are combined by calculating the average of the vectors, which includes calculating the averages for each of the elements within the vector. In another example embodiment, the vectors are merged by calculating the sum of the compressed vectors 608. In yet other example embodiments, some of the words are not included for calculating the article vector 612 because some of the words may be noise for some of the articles.

In some example embodiments, weights are assigned to each of the word vectors before combining them, based on their expected contribution to the meaning of the article, and the article vector 612 is calculated by adding the weighted vectors for each of the words. It is noted that one of the weights may be 0, which is equivalent to not using the word vector for the article vector 612. In one example embodiment, the weights are calculated utilizing term frequency—inverse document frequency (TF-IDF) scores.

TF-IDF is a numerical statistic intended to reflect how important a word is to a document in a collection or corpus. The TF-IDF increases in value proportionally to the number of times a word appears in the document, but is offset by the frequency of the word in the corpus, which helps to adjust for the fact that some words appear more frequently in general.

Once the compressed vectors are available, it is possible to determine 614 if two articles are similar by calculating the distance between the article vectors (e.g., 612 and 613). The result is an article similarity value 616. The article similarity may then be used as another tool to determine the topics of an article, as articles corresponding to the same topic will be near each other. The distance may be calculated as the cosine similarity of the two vectors, the Euclidean distance, or some other distance metric.

Figure 7:
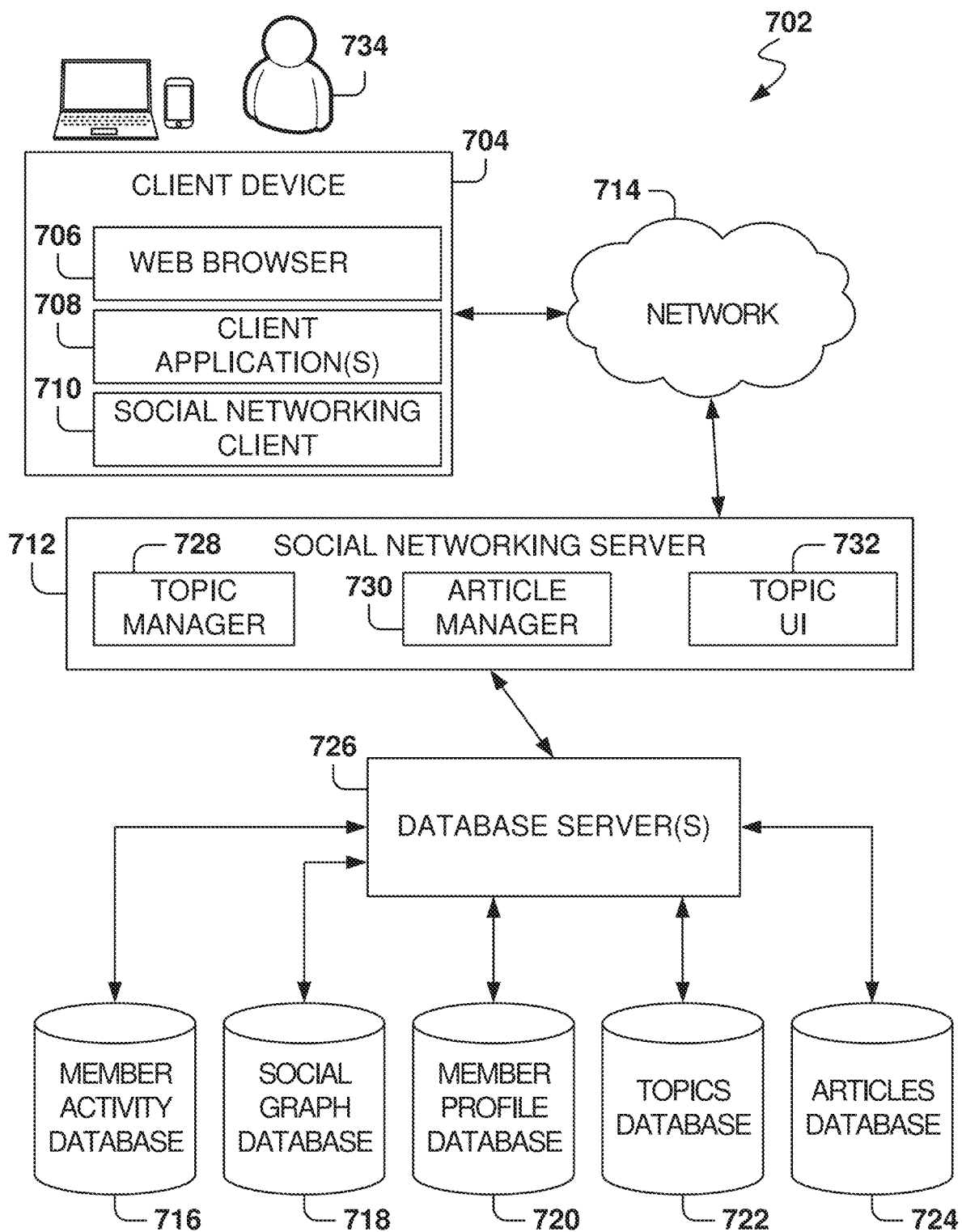
FIG. 7 is a block diagram illustrating a networked system, according to some example embodiments, including a social networking server.

FIG. 7 is a block diagram illustrating a networked system, according to some example embodiments, including a social networking server 712, illustrating an example embodiment of a high-level client-server-based network architecture 702. The social networking server 712 provides server-side functionality via a network 714 (e.g., the Internet or a wide area network (WAN)) to one or more client devices 704. FIG. 7 illustrates, for example, a web browser 706, client application(s) 708, and a social networking client 710 executing on a client device 704. The social networking server 712 is further communicatively coupled with one or more database servers 726 that provide access to one or more databases 716-724.

The client device 704 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 734 may utilize to access the social networking server 712. In some embodiments, the client device 704 may comprise a display module (not shown) to display information (e.g., in the form of user interfaces). In further embodiments, the client device 704 may comprise one or more of touch screens, accelerometers, gyroscopes, cameras, microphones, global positioning system (GPS) devices, and so forth.

In one embodiment, the social networking server 712 is a network-based appliance that responds to content requests or search queries from the client device 704. One or more users 734 may be a person, a machine, or other means of interacting with the client device 704. In various embodiments, the user 734 is not part of the network architecture 702, but may interact with the network architecture 702 via the client device 704 or another means.

The client device 704 may include one or more applications (also referred to as "apps") such as, but not limited to, the web browser 706, the social networking client 710, and other client applications 708, such as a messaging application, an electronic mail (email) application, a news application, and the like. In some embodiments, if the social networking client 710 is present in the client device 704, then the social networking client 710 is configured to locally provide the user interface for the application and to communicate with the social networking server 712, on an as-needed basis, for data and/or processing capabilities not locally available (e.g., to access a member profile, to authenticate a user 734, to identify or locate other connected members, etc.). Conversely, if the social networking client 710 is not included in the client device 704, the client device 704 may use the web browser 706 to access the social networking server 712.

Further, while the client-server-based network architecture 702 is described with reference to a client-server architecture, the present subject matter is of course not limited to such an architecture, and could equally well find application in a distributed, or peer-to-peer, architecture system, for example.

In addition to the client device 704, the social networking server 712 communicates with the one or more database server(s) 726 and database(s) 716, 718, 720, 722, and 724. In one example embodiment, the social networking server 712 is communicatively coupled to a member activity database 716, a social graph database 718, a member profile database 720, a topics database 722, and an articles database 724.

The member profile database 720 stores member profile information about members who have registered with the social networking server 712. With regard to the member profile database 720, the member may include an individual person or an organization, such as a company, a corporation, a nonprofit organization, an educational institution, or other such organizations.

Consistent with some example embodiments, when a user initially registers to become a member of the social networking service provided by the social networking server 712, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 720. Similarly, when a representative of an organization initially registers the organization with the social networking service provided by the social networking server 712, the representative may be prompted to provide certain information about the organization, such as a company industry. This information may be stored, for example, in the member profile database 720.

In some embodiments, the profile data may be processed (e.g., in the background or offline) to generate various derived profile data. For example, if a member has provided information about various job titles that the member has held with the same company or different companies, and for how long, this information may be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

In some example embodiments, the articles database 724 stores articles for presentation on the social network. For each article, the articles database 724 includes one or more of article author, posting date, title, abstract, tags, text, images, video, related topics, and the like.

As users interact with the social networking service provided by the social networking server 712, the social networking server 712 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 712), updating a current status, posting content for other members to view and comment on, posting job suggestions for the members, searching job posts, and other such interactions. In one embodiment, records of these interactions are stored in the member activity database 716, which associates interactions made by a member with his or her member profile stored in the member profile database 720. In one example embodiment, the member activity database 716 includes the posts created by the users of the social networking service for presentation on user feeds.

The topics database 722 includes information about existing topics and their relationships in the hierarchy. Each topic includes one or more of a name, related tags, parent topic, children topics, super topics, subtopics, and pointers to articles associated with the topic.

In one embodiment, the social networking server 712 communicates with the various databases through the one or more database server(s) 726. In this regard, the database server(s) 726 provide one or more interfaces and/or services for providing content to, modifying content in, removing content from, or otherwise interacting with the databases 716-724. For example, and without limitation, such interfaces and/or services may include one or more Application Programming Interfaces (APIs), one or more services provided via a Service-Oriented Architecture (SOA), one or more services provided via a Representational State Transfer (REST)-Oriented Architecture (ROA), or combinations thereof.

The social networking server 712 includes, among other modules, a topic manager 728, an article manager 730, and a topic user interface 732. The modules may be implemented in hardware, software (e.g., programs), or a combination thereof. The topic manager 728 provides utilities for managing the topics within the social network. The article manager 730 provides utilities for managing the articles within the social network, as well as links to the articles outside the social network. Further, the topic user interface 732 provides an interface topic pages and article pages.

Figure 8:
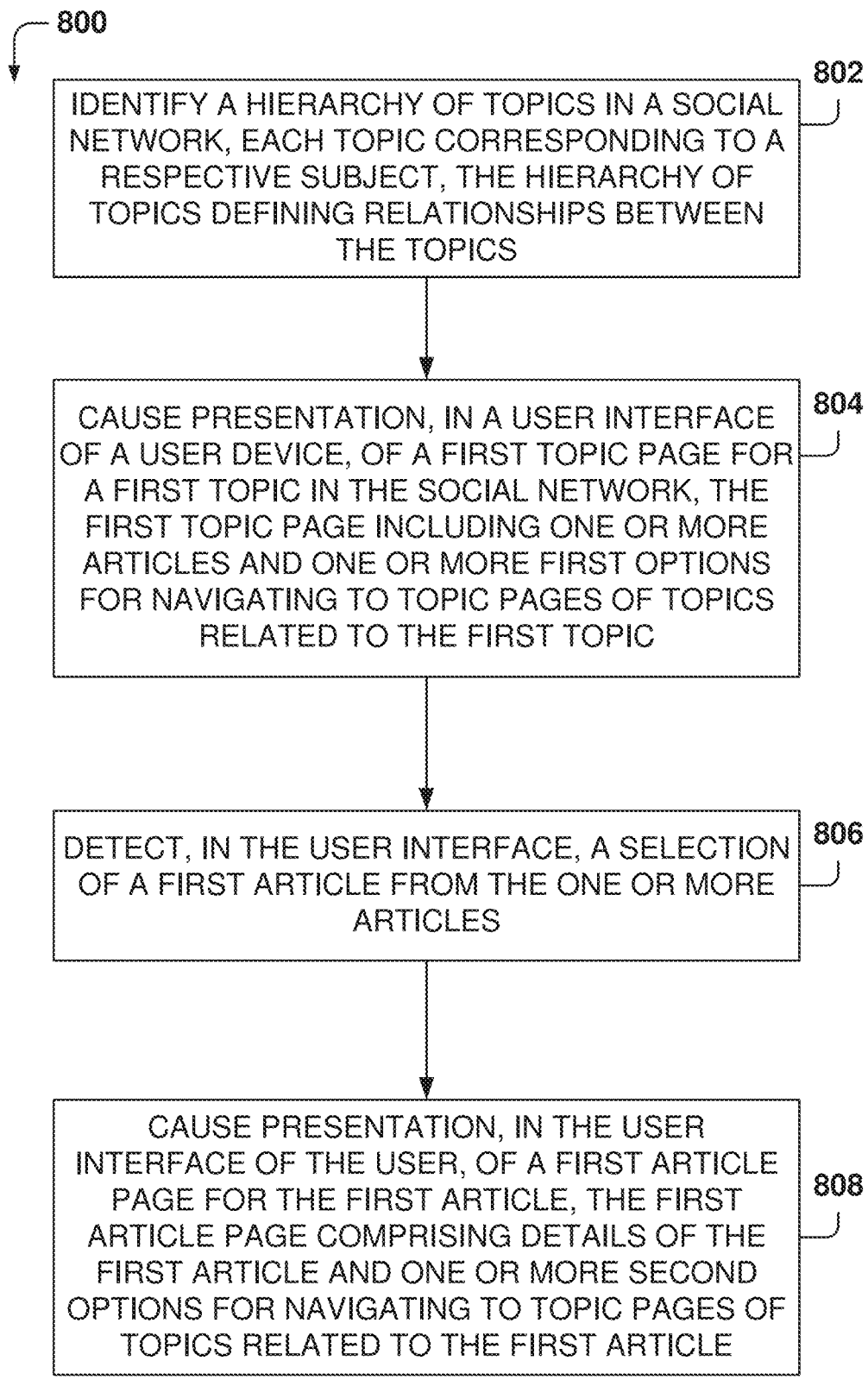
FIG. 8 is a flowchart of a method for providing a user experience that facilitates navigation among different topics and articles on a social network, according to some example embodiments.

FIG. 8 is a flowchart of a method 800 for providing a user interface to facilitate navigation among different topics and articles in a social network, according to some example embodiments. While the various operations in this flowchart are presented and described sequentially, one of ordinary skill will appreciate that some or all of the operations may be executed in a different order, be combined or omitted, or be executed in parallel.

Operation 802 is for identifying a hierarchy of topics in a social network. Each topic corresponds to a respective subject, and the hierarchy of topics defines relationships between the topics.

From operation 802, the method 800 flows to operation 804 for causing presentation, in a user interface of a user device, of a first topic page for a first topic in the social network. The first topic page includes one or more articles and one or more first options for navigating to topic pages of topics related to the first topic.

From operation 804, the method 800 flows to operation 806, where one or more processors detect a selection in the user interface of a first article from the one or more articles.

From operation 806, the method 800 flows to operation 808 where, in response to detecting the selection of the first article, the one or more processors cause presentation in the user interface of the user device of a first article page for the first article. The first article page comprises details of the first article and one or more second options for navigating to topic pages of topics related to the first article.

In one example, the hierarchy of topics defines parent-child relationships among the topics, where a child topic of a parent topic has a more specific subject than the parent topic, and the parent topic has a more general subject than the child topic. The super topics of a given topic include ascendant topics of the given topic, and subtopics of the given topic include descendant topics of the given topic.

In one example, the one or more first options include a set of super topics and a set of subtopics.

In one example, the one or more second options include links for navigating to one or more topic pages related to the first article.

In one example, the method 800 further comprises training a machine-learning program for identifying the topic pages related to the first article, the machine-learning program assessing features regarding content of the first article, activities of the user in the social network, and the hierarchy of topics.

In one example, the method 800 further comprises detecting, while presenting the first article page, a selection of a second topic; and causing presentation, in the user interface, of a second topic page for the second topic.

In one example, the method 800 further comprises training a machine-learning program for ranking the articles for presentation in the first topic page, the machine-learning program assessing features related to each article, activities of users in the social network, and topic information.

In one example, the method 800 further comprises training a machine-learning program for identifying topics related to a given topic, the machine-learning program assessing features related to topic information, the hierarchy of topics, article information, and activities of users in the social network.

In one example, the one or more articles are presented in a topic feed of the first topic page, wherein the user interface provides for scrolling down the topic feed to see additional articles.

Figure 9:
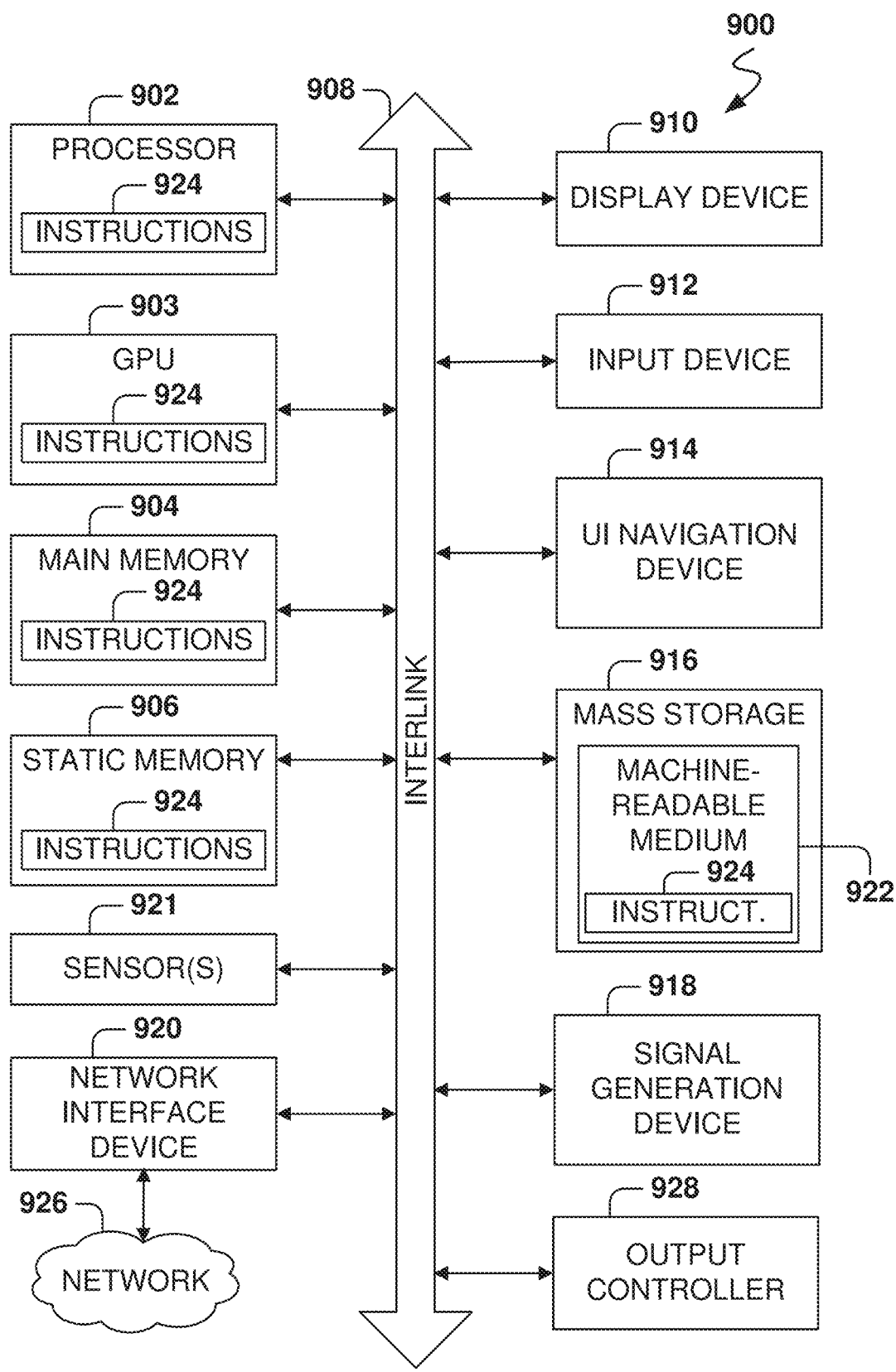
FIG. 9 is a block diagram illustrating an example of a machine upon or by which one or more example process embodiments described herein may be implemented or controlled.

FIG. 9 is a block diagram illustrating an example of a machine 900 upon or by which one or more example process embodiments described herein may be implemented or controlled. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a hardware processor core, or any combination thereof), a graphics processing unit (GPU) 903, a main memory 904, and a static memory 906, some or all of which may communicate with each other via an interlink (e.g., bus) 908. The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, within the hardware processor 902, or within the GPU 903 during execution thereof by the machine 900. In an example, one or any combination of the hardware processor 902, the GPU 903, the main memory 904, the static memory 906, or the mass storage device 916 may constitute machine-readable media.

While the machine-readable medium 922 is illustrated as a single medium, the term "machine-readable medium" may include a single medium, or multiple media, (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that cause the machine 900 to perform any one or more of the techniques of the present disclosure, or that is capable of storing, encoding, or carrying data structures used by or associated with such instructions 924. Non-limiting machine-readable medium examples may include solid-state memories, and optical and magnetic media. In an example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

identifying topics in content presented by a social network, each topic corresponding to a respective subject that may be checked to determine if an article belongs to the topic, each topic associated with a topic page for presenting, in a first user interface (UI), articles associated with the topic and one or more other topics related to the topic;

identifying a hierarchy of topics in the social network, wherein the hierarchy of topics defines child-parent relationships between the topics, a super topic of a given topic being any topic above the given topic in the hierarchy of topics, wherein the super topic is a broader topic than the given topic;

training a machine-learning program to obtain a model for identifying topic pages that are related to a given article, the machine-learning program assessing features regarding content of the given article, activities of users in the social network, and the hierarchy of topics, the model configured to receive the given article as an input and generate an output with the topics related to the given article;

causing presentation, in the first UI, of a first topic page for a first topic in the social network, the first topic page including one or more articles related to the subject associated with the first topic and one or more first options for navigating to topic pages of topics related to the first topic;

detecting, by one or more processors, in the first UI, a selection of a first article from the one or more articles in the first topic page;

identifying, by the model based on the first article as input, topic pages related to the first article; and in response to detecting the selection of the first article, causing, by the one or more processors, presentation in a second UI of a first article page for the first article, the first article page comprising details of the first article and one or more second options for navigating to the topic pages related to the first article.

2. The method as recited in claim 1, wherein the hierarchy of topics defines parent-child relationships among the topics, wherein a child topic of a parent topic has a more specific subject than the parent topic and the parent topic has a more general subject than the child topic, wherein the super topics of the given topic include ascendant topics of the given topic, and wherein subtopics of the given topic include descendant topics of the given topic.

3. The method as recited in claim 2, wherein the one or more first options in the first UI include navigating to one or more super topics and navigating to one or more subtopics.

4. The method as recited in claim 1, wherein the one or more second options include links for navigating to one or more topic pages related to the first article.

5. The method as recited in claim 1, further comprising:
detecting, while presenting the first article page, a selection of a second topic; and
causing presentation, in the first UI, of a second topic page for the second topic.

6. The method as recited in claim 1, further comprising:
training a machine-learning program for ranking the articles for presentation in the first topic page, the machine-learning program assessing features related to each article, activities of users in the social network, and topic information.

7. The method as recited in claim 1, further comprising:
training a machine-learning program to obtain a related-topic model for identifying topics related to a given topic, the machine-learning program assessing features related to topic information, the hierarchy of topics, article information, and activities of users in the social network.

8. The method as recited in claim 1, wherein the one or more articles are presented in a topic feed of the first topic page, wherein the first UI provides an option for scrolling down the topic feed to see additional articles.

9. A system comprising:
a memory comprising instructions; and
one or more computer processors, wherein the instructions, when executed by the one or more computer processors, cause the one or more computer processors to perform operations comprising:

identifying topics in content presented by a social network, each topic corresponding to a respective subject that may be checked to determine if an article belongs to the topic, each topic associated with a topic page for presenting, in a first user interface (UI), articles associated with the topic and one or more other topics related to the topic;

identifying a hierarchy of topics in the social network, wherein the hierarchy of topics defines child-parent relationships between the topics, a super topic of a given topic being any topic above the given topic in the hierarchy of topics, wherein the super topic is a broader topic than the given topic;

training a machine-learning program to obtain a model for identifying topic pages that are related to a given article, the machine-learning program assessing features regarding content of the given article, activities of users in the social network, and the hierarchy of topics, the model configured to receive the given article as an input and generate an output with the topics related to the given article;

causing presentation, in the first UI, of a first topic page for a first topic in the social network, the first topic page including one or more articles related to the subject associated with the first topic and one or more first options for navigating to topic pages of topics related to the first topic;

detecting, in the first UI, a selection of a first article from the one or more articles in the first topic page;

identifying, by the model based on the first article as input, topic pages related to the first article; and in response to detecting the selection of the first article, causing presentation in a second UI of a first article page for the first article, the first article page comprising details of the first article and one or more second options for navigating to the topic pages related to the first article.

10. The system as recited in claim 9, wherein the hierarchy of topics defines parent-child relationships among the topics, wherein a child topic of a parent topic has a more specific subject than the parent topic and the parent topic has a more general subject than the child topic, wherein the super topics of the given topic include ascendant topics of the given topic, and wherein subtopics of the given topic include descendant topics of the given topic.

11. The system as recited in claim 9, wherein the one or more first options in the first UI include navigating to one or more super topics and navigating to one or more subtopics.

12. The system as recited in claim 9, wherein the one or more second options include links for navigating to one or more topic pages related to the first article.

13. The system as recited in claim 9, wherein the instructions further cause the one or more computer processors to perform operations comprising:
  detecting, while presenting the first article page, a selection of a second topic; and
  causing presentation, in the first UI, of a second topic page for the second topic.

14. A non-transitory machine-readable storage medium including instructions that, when executed by a machine, cause the machine to perform operations comprising:
  identifying topics in content presented by a social network, each topic corresponding to a respective subject that may be checked to determine if an article belongs to the topic, each topic associated with a topic page for presenting, in a first user interface (UI), articles associated with the topic and one or more other topics related to the topic;
  identifying a hierarchy of topics in the social network, wherein the hierarchy of topics defines child-parent relationships between the topics, a super topic of a given topic being any topic above the given topic in the hierarchy of topics, wherein the super topic is a broader topic than the given topic;
  training a machine-learning program to obtain a model for identifying topic pages that are related to a given article, the machine-learning program assessing features regarding content of the given article, activities of users in the social network, and the hierarchy of topics, the model configured to receive the given article as an input and generate an output with the topics related to the given article;
  causing presentation, in the first UI, of a first topic page for a first topic in the social network, the first topic page including one or more articles related to the subject associated with the first topic and one or more first options for navigating to topic pages of topics related to the first topic;
  detecting, in the first UI, a selection of a first article from the one or more articles in the first topic page;
  identifying, by the model based on the first article as input, topic pages related to the first article; and
  in response to detecting the selection of the first article, causing presentation in a second UI of a first article page for the first article, the first article page comprising details of the first article and one or more second options for navigating to the topic pages related to the first article.

15. The non-transitory machine-readable storage medium as recited in claim 14, wherein the hierarchy of topics defines parent-child relationships among the topics, wherein a child topic of a parent topic has a more specific subject than the parent topic and the parent topic has a more general subject than the child topic, wherein the super topics of the given topic include ascendant topics of the given topic, and wherein subtopics of the given topic include descendant topics of the given topic.

16. The non-transitory machine-readable storage medium as recited in claim 15, wherein the one or more first options in the first UI include navigating to one or more super topics and navigating to one or more subtopics.

17. The non-transitory machine-readable storage medium as recited in claim 14, wherein the one or more second options include links for navigating to one or more topic pages related to the first article.

* * * * *